United States Patent
Atherton et al.

(10) Patent No.: US 7,000,087 B2
(45) Date of Patent: Feb. 14, 2006

(54) PROGRAMMATICALLY PRE-SELECTING SPECIFIC PHYSICAL MEMORY BLOCKS TO ALLOCATE TO AN EXECUTING APPLICATION

(75) Inventors: William Edward Atherton, Durham, NC (US); Raghunath Reddy Kallem, Durham, NC (US); David James Rudda, Jr., Morrisville, NC (US); David C. Wu, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 10/008,615

(22) Filed: Nov. 7, 2001

(65) Prior Publication Data

US 2003/0097536 A1 May 22, 2003

(51) Int. Cl.
*G06F 13/00* (2006.01)
(52) U.S. Cl. .................. 711/170; 711/203; 711/206
(58) Field of Classification Search ............... 711/170, 711/203, 206
See application file for complete search history.

(56) References Cited

U.S. PATENT DOCUMENTS

| | | | |
|---|---|---|---|
| 5,619,696 A | * | 4/1997 | Nakagawa ................... 718/100 |
| 5,784,699 A | | 7/1998 | McMahon et al. |
| 5,950,231 A | | 9/1999 | Nichol |

FOREIGN PATENT DOCUMENTS

EP           0851353 A1     7/1998

\* cited by examiner

*Primary Examiner*—Reba I. Elmore
(74) *Attorney, Agent, or Firm*—Martin J. McKinley; Dillon & Yudell LLP

(57) ABSTRACT

A method and system for allocating pre-selected physical memory locations to an application executing on a data processing system. Memory allocation subroutines, interacting with the programming interfaces of the operating system (OS), allocates and looks down blocks of memory. The memory allocation subroutines then de-allocates the memory blocks based on whether or not the memory blocks fall within the pre-selected range of physical memory locations. The physical memory locations of the blocks locked down are discovered using the driver. The driver takes the virtual address of the specified memory locations and returns with a corresponding physical address. The memory allocation subroutines provide functions that allow the program developer to specify the number of physical pages to allocate and a range of physical addresses and comprises algorithm(s) that allocates the physical memory within the selected range.

32 Claims, 6 Drawing Sheets

PROGRAMMATICALLY PRE-SELECTING SPECIFIC PHYSICAL MEMORY BLOCKS TO ALLOCATE TO AN EXECUTING APPLICATION

BACKGROUND OF THE INVENTION

1. Technical Field

The present invention relates generally to data processing systems and in particular to memory allocation in data processing systems. Still more particularly, the present invention relates to a method and system for specifying a particular physical memory location to allocate to an application running on a data processing system.

2. Description of the Related Art

A standard data processing system comprises one or more central processing units (CPU), one or more levels of caches, one or more memory, and input/output (I/O) mechanisms all interconnected via an interconnect. Traditionally, the interconnects utilized consisted primarily of a system bus and an I/O bus. In newer processing systems, however, particularly those with large numbers of CPUs and distributed memory, a switch is often utilized as the interconnecting mechanism. In current systems also, the configuration of the data processing system may involve linking of separate systems (processor groups with associated memory, etc.) in a node-configured distributed system. For example, non-uniform memory access (NUMA) systems comprise this node configuration.

In addition to the major hardware components, a major software (or firmware) component of a data processing system is an Operating System (OS). The OS provides an environment for the execution of programs by providing specific services to the programs including loading the programs into memory and running the program. The OS also provides resource allocation when there are multiple users or jobs running simultaneously. One of the more widely utilized operating systems is Windows® (a trademark of Microsoft Corporation).

In order for an application to operate correctly, it must interact in a somewhat predictable way with the OS. Thus, application developers typically take their applications through a series of operational runs before placing the application on the market. Also, applications running on the computer system utilizes a portion of available memory during operation. Thus, in addition to consideration of the OS, consideration is often also given to the allocation and utilization of memory by the application. The OS is responsible for allocating memory and deallocating memory to the various applications (via memory controller) and thus utilization of memory by the application is dependent on the OS' method of allocating and deallocating memory.

Memory comprises a large array of words or bytes, each with its own address. During operation of an application, most processing systems allow the application's process(es) to reside in any part of physical memory. The portion of memory allocated may be selected at random (although the present invention allows selection of specific areas of memory). Basically, the key allocation step involves mapping of symbolic program address (i.e., a logical or virtual address) to actual physical address (in the memory). The virtual memory address is placed within the memory address register and a run time mapping from virtual to physical address is completed by a memory management unit (MMU).

When all of the memory may be allocated, performing the memory allocation is accomplished relatively easily. However, if specific areas of the memory need to be tested (or allocated), then the allocation and any testing becomes fairly difficult. With traditional data processing system configuration, i.e., systems with a single, congruent memory, allocating and/or testing the memory during program execution is easily accomplished. The OS is only able to allocate blocks within the single memory of the system.

In today's computer systems, the system memory is managed by the operating system and is allocated to different software applications as needed. Use of virtual memory is a technique by which a relatively smaller amount of physical memory can be made to seem larger and shareable among many processes. Each software application therefore deals with "effective" addresses in a virtual memory space, which allow the application to read, write, and execute when required, without ever being concerned with the actual locations, in physical or disk memory, where the operations are taking place. The physical address space is considered as a contiguous space. Each physical address corresponds to a storage location in a memory bank within a system memory. The application relies on the OS to perform the mapping from the effective address to a physical address and the allocation of the physical address to the requesting process.

In a typical data processing system, information is typically loaded in a system memory wherever free space is available. Thus, a virtual address of a block of information usually does not reflect the physical address (or actual address) in the system memory in which the information is actually stored. Thus, present applications that run under the Windows® OS cannot specify/request a specific physical address when polling for allocated memory from the OS. Likewise, the OS does not provide any detail of the allocated memory (i.e., physical address(es) to the applications.

Newer operating systems, such as Windows® 2000 are able to address up to 64G (gigabytes) of physical memory, which, as explained above, may be any memory block across the system. The ability to control the exact memory location allocated to an application during testing and/or execution in order to properly predict memory allocation thus becomes extremely important.

European patent EP 0 851 353 A1 describes a method of allocating memory space in a main memory of a computer system to a unified memory architecture device and also describes how physical memory can be organized. This is accomplished by getting a linear address range, and mapping physical memory. Also, Microsoft Windows® 2000 provides separate functions to allocate and/or de-allocate an amount of physical memory, allocate a linear address range, and map the physical memory to the linear address range in an application program. Microsoft Windows® 2000 further provides a driver function to convert a linear address to a physical address. In Microsoft's implementation, when allocating physical memory, the physical memory is locked down and cannot be swapped/exchanged.

Also, when testing memory allocation in a multi-node configured system such as "NUMA", where memory resources can be located across two different processing systems, for performance reasons, there is a high probability that the Windows® OS (e.g., Whistler and beyond) running on a first system will try to allocate the memory on the same system. However, the OS' memory allocation functions in the multi-node system is not easily predicted because the OS may occasionally allocate the memory of a second system during processing to a process running on a first data processing system.

Thus, for example, a process running on the CPU in the first system that comprises a memory may selectively allocate the memory resources located on the first system, the memory resources on the second system, or both memory resources, and there is currently no way for the application developer to specify which specific physical block of memory to allocate to the application. Because of this occurrence, which is currently unpredictable, the present invention recognizes that predicting memory allocation and usage by a process running on both a single node and multi-node configured data processing system is sometimes desirable.

Based on the foregoing, the present invention recognizes that it would be desirable to provide application directed memory access. A method, system and program product by which application developers can direct the operating system which address blocks of memory to allocate to the application when executing on the data processing system would be a welcomed improvement. It would be further desirable to extend these memory allocation features to a multi-node configured system with distributed memory across different systems. These and other benefits are provided by the invention described herein.

SUMMARY OF THE INVENTION

In accordance with a preferred embodiment of the present invention, disclosed is a method and system for allocating pre-selected physical memory locations to an application executing on a data processing system. A kernel mode driver and memory allocation subroutines are provided. The memory allocation subroutines, interacting with the programming interfaces of the OS allocates and locks down blocks of memory. The memory allocation subroutines then deallocates the memory blocks based on whether or not the memory blocks fall within the pre-selected range of physical memory locations. The physical memory locations of the blocks locked down are discovered using the driver. The driver takes the virtual address of the specified memory locations and returns with a corresponding physical address.

This process involves the use of AWE APIs of the OS, which allows the physical memory to be locked down. The memory allocation subroutines provides functions that allow the program developer to specify the number of physical pages to allocate and a range of physical addresses. The memory allocation subroutines also comprises the algorithm (s), that allocates the physical memory within the selected range.

The preferred embodiment of the invention is completed with Windows® 2000 OS and its provided functional features. The invention expands the functionality of the OS to enable different allocation and organization of physical memory besides the regular physical memory allocation functions provided. In one embodiment, specific formulas are utilized to determine the maximum amount of memory to allocate without grabbing too much memory, and memory is allocated in chunks when requested by the application.

One embodiment of the invention extends the memory allocation features to a multi-node computer system having more than one memory. Accordingly, this embodiment allows pre-selection of specific memory blocks across nodes as well as in local memory. This embodiment, is particularly useful for testing memory allocation across nodes in such a multi-node configured system.

In the preferred embodiment, the memory allocation routines are a component part of the application housed in memory. In another embodiment, these routines are programmed within the software of the data processing system as a dynamic link library file. In a third embodiment, the memory allocation subroutines, particularly the lock down and allocation/de-allocation processes are completed by a driver that is provided the necessary functional software and hardware elements to complete the functions entailed.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
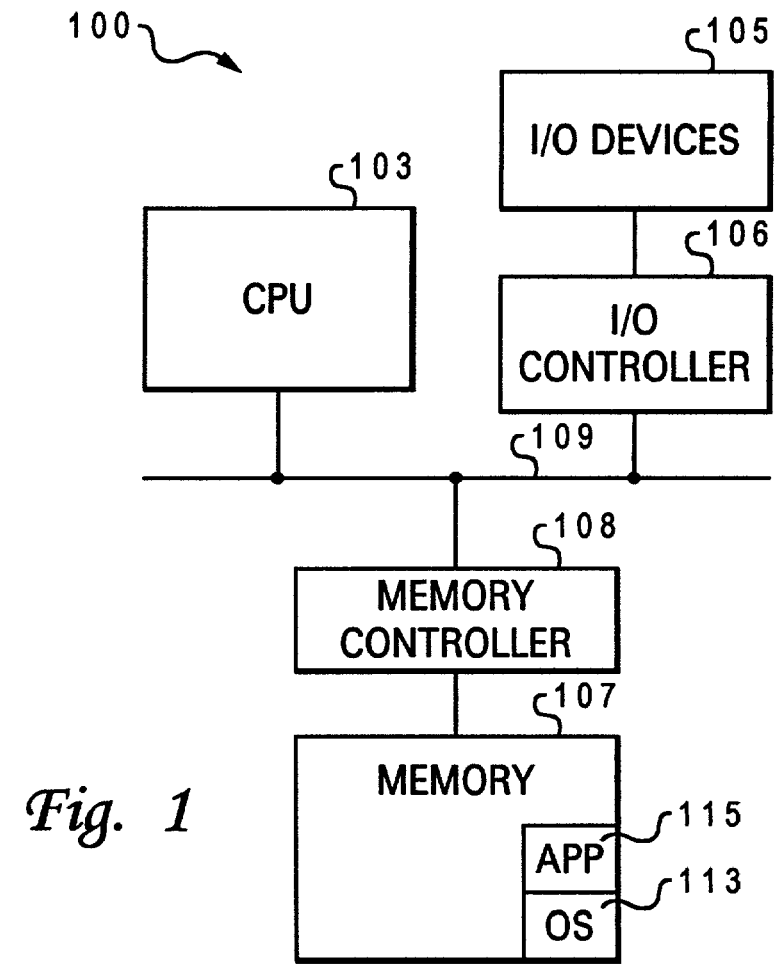
FIG. 1 is a block diagram illustrating the core components and peripheral devices of a data processing system with which the preferred embodiment of the invention may be implemented.

The present invention provides a method, system, and program product by which an application developer may specify a physical memory location to allocate to the application's processes when the application is executing on a data processing system. The invention finds applicability in most data processing systems (with specific operating system (OS) functionality), however the preferred embodiment will be described with reference to a single node data processing system (i.e., having a processor or processor group coupled to a single contiguous memory as illustrated in FIG. 1 and described below. An alternate embodiment of the invention is implemented in a multi-node data processing system comprising two separate processing systems having separate CPUs and separate memory components that are connected via a node as illustrated in FIG. 3A.

With reference now to FIG. 1, there is illustrated a data processing system in which a preferred embodiment of the invention may be implemented. Data processing system 100 comprises several major components, including central processing unit (CPU) (or processor) 103, I/O devices 105 and memory 107. CPU 103, I/O devices 105 and memory 107 (e.g., DIMM) are interconnected via a system bus 109. In order to properly execute related logic functions, I/O devices 105 and memory 107 both have respective controllers. Thus I/O controller 106 manages input and output processes between the I/O devices 105 and the CPU 103 (or memory 107). Likewise, memory controller 108 manages operations involving memory access and allocation/deallocation of memory 107.

Although, the illustrated embodiment depicts only basic components of a data processing system interconnected via a system bus, it is understood that data processing system 100 may be more complex. Data processing system 100 may comprise additional processing systems, with each processing system having additional components (or similar components with a different configuration). Component parts of a data processing system may also be interconnected via other methods, such as a switch, for example. Presentation of a particular data processing system configuration is therefore not limiting on the scope of the invention.

Illustrated within memory 107 is operating system (OS) 113 and application 115. Both OS 113 and application 115 are functional, software encoded components. The OS 113 resides in memory 107 on a permanent basis. Application 115 refers to processes being currently run on the data processing system 100 (by the processor 103) and whose processes temporarily utilize portions of memory. That is, application processes are temporarily loaded into memory 107 when running. OS 113 is responsible for allocation and deallocation of memory space as needed by application 115. System calls provide the interface between a process of the application and the OS. According to the preferred embodiment, these system calls include encoded calls for allocation of specific memory blocks to the application process, as described below. The illustrative embodiment provided herein utilizes Windows® 2000 as the OS and takes advantage of the functionality of Windows® 2000, specifically its Advanced Windowing Extensions (AWE) application programming interfaces (APIs) as described below.

The invention requires utilization of a physical memory access procedure that is available to the processing system, however, key to the invention is the utilization of an address translation device that maps virtual addresses to actual physical addresses and returns the physical addresses. The process by which this is accomplished is described below but is not meant to be limiting on the invention. Address translation is the mechanism by which effective addresses generated by the CPU to access virtual memory are translated into real (physical) memory addresses. Several types of address translation operations may be utilized. In the preferred embodiment, a kernel-mode driver (e.g., the Getphysaddr driver) is utilized to complete the translation functions (i.e., virtual to physical address conversion) described in more detail below required by the other processes of the invention.

The present invention enables executing application processes to specify pre-selected physical memory locations to the OS when requesting an allocation of memory for that process. Implementation of the invention requires two major components: (1) a kernel-mode driver; and (2) memory allocation subroutines. In the preferred embodiment, a Getphysaddr driver is utilized. The preferred embodiment of the invention makes use of the driver function written by Microsoft, which obtains the physical address from the linear or virtual address. In the preferred embodiment, the invention "wraps" the driver function so that the physical address can be sent to the application. Thus, the driver takes a virtual address provided by the application and returns the corresponding physical address. The memory allocation subroutines allocate and deallocate memory and uses the driver appropriately to get the required range of physical addresses. The allocation and deallocation is done through the AWE APIs which are provided by the OS and allows physical memory to be locked down.

One alternate implementation includes the functional aspects of the memory allocation routine as coded operations of the driver. Thus, the driver is provided the ability to allocate physical memory within a certain address range once the actual physical addresses have been determined. However, this requires further logic implementation and current OS operations are sufficient for providing the allocation features in conjunction with the MAS.

Figure 2:
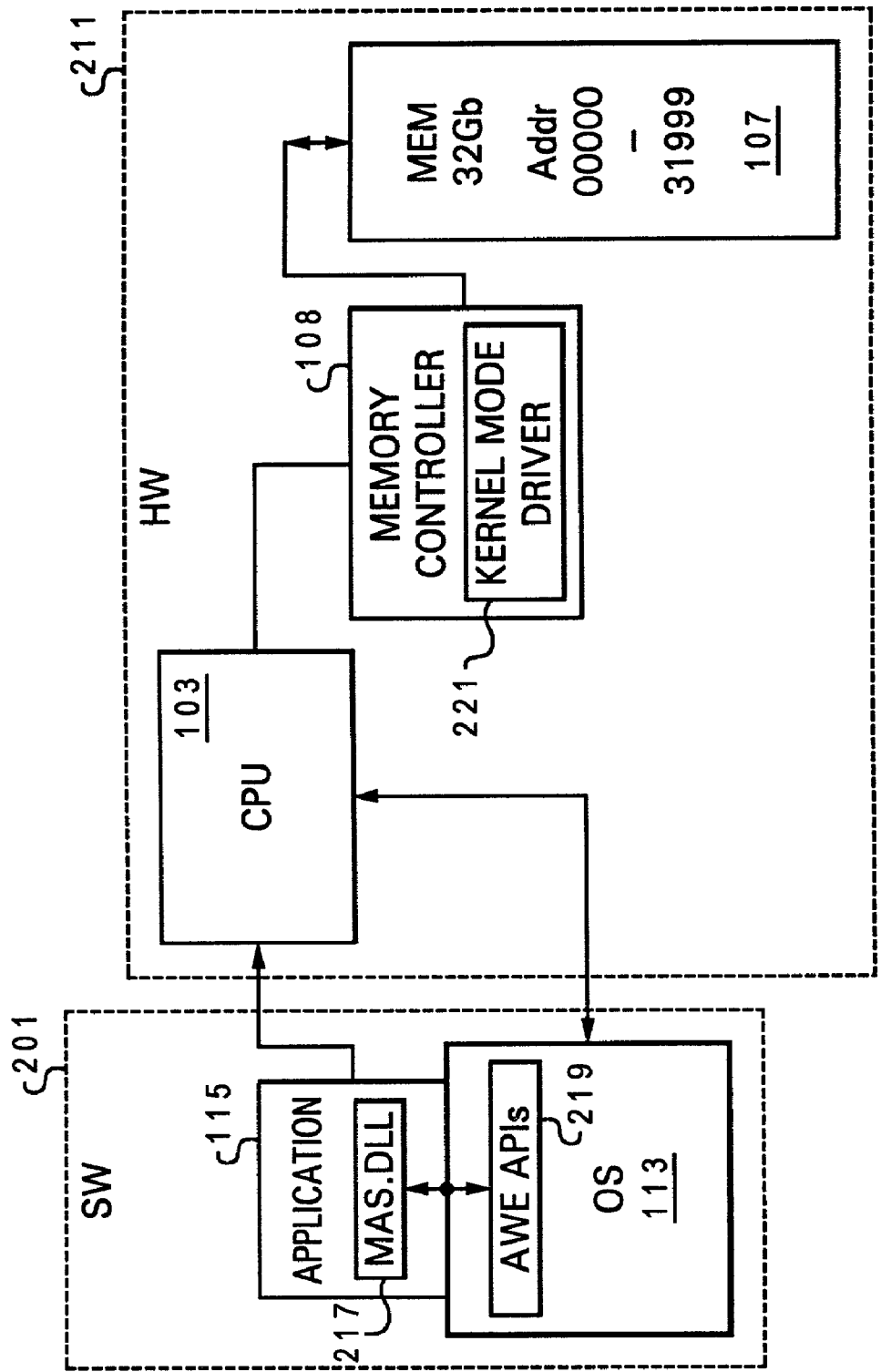
FIG. 2 is a block diagram of relevant software and hardware components of the data processing system of FIG. 1 in accordance with a preferred embodiment of the invention.

Thus, the implementation of the invention requires creation of a software-enabled memory allocation routine(s), which is able to link with the AWE APIs of the OS to direct specific allocation and deallocation of selected memory blocks. FIG. 2 illustrates the major components of the invention (both hardware and software). The interaction of the various components to effect the features of the invention are described following the description of FIG. 2. As shown, FIG. 2 includes major software components 201 and hardware components 211. Software components comprise an application 115, which "sits" on top of the OS 113. As described above, with respect to FIG. 1, these software components actually reside within memory, although application 115 may technically exist on another storage medium, with only relevant processes being temporarily stored within memory 107. Within application 115, are a number of memory allocation subroutines 217 (hereinafter referred to as MAS 217). Within OS 113 are a number of AWE APIs 219, by which the application and specifically MAS 217 is able to interact with the OS 113 to complete the processing required. According to the preferred embodiment, the MAS 217 are encoded within a dynamic link library (dll) file.

Hardware (firmware) components include CPU 103, kernel mode driver 221, memory controller 108, and memory 107. For illustrative purposes, memory 107 is assumed to contain physical memory blocks with addresses 00000–31999. Thus, an application developer may specify a range, e.g., 10000–20000 and a size, e.g., 4K or 4096 bytes for a 32-bit Intel processor (or 8K for an Alpha processor), for allocation, and the memory allocation subroutine then allocates 4096 bytes of memory in the address range of 10000 to 20000, as will become clear later. Interconnection between the various components are illustrated by arrows. The OS and Application are "connected to" (and/or provide processes for execution on) the CPU 103. The OS is further "connected to" the kernel mode driver 221 so as to trigger the translation functions by which physical addresses are generated and returned to the OS's AWE APIs.

In the preferred embodiment, pre-selection of the specific physical memory addresses for allocation to the application's processes are completed by the application developer utilizing an interactive component of the MAS 217. The memory allocation subroutines are packaged into a MAS dynamic link library (MAS.dll). These allocation subroutines provide certain functions, which allows the application developers to specify several parameter values. In the preferred embodiment, the programmer is prompted to enter/select parameter values including: (1) the number of physical pages to allocate, (2) a desired address range of physical memory, and (3) a specific algorithm from among several available algorithms that may be utilized to allocate the physical memory within the range. The functions utilize these inputs when the application is being executed on the data processing system to return a memory structure, which is compatible for use with the AWE application programming interfaces (API)s.

According to the preferred embodiment, which implements a first (default) algorithm, a series of repetitive/sequenced steps are utilized to complete the selective allocation and subsequent deallocation processes. The initial step requires that either all or some of the non-swapable physical memory is allocated and locked by MAS via the OS. This allocation and lock down of portions of or all of the memory is enabled by the application functions provided by the OS (e.g., Microsoft 2000) in conjunction with the kernel mode driver. References to "all" memory may include certain limitations. For example, "all" may be limited by the maximum amount of physical memory that the OS will allocate to a single program/process at the particular time. Also, there could be other artificial limits on what "all" could be, such as when trying to allocate only the available physical memory at the time rather than all of the physical memory in the system. Finally, memory may not be able to be allocated at once, and could be allocated in smaller amounts. Accordingly, in one of the available algorithms. The smaller block of memory is then processed (i.e., a determination made about whether the addresses are within the pre-selected range) before a next block can be allocated and processed.

Once the allocation of all memory is completed, the physical memory allocated is analyzed, and the physical pages that fit into the address range desired are identified. The pages that fit into the desired range are marked or moved so that they are kept by (or allocated to) the application. In other embodiments, additional processing may occur. For example, all the physical pages allocated may be sorted by address, and then the pages may be checked to see if they fit in the range. Several variations of the algorithm and thus the type of analyses desired are provided, and any one may be selected by the application developer. According to the preferred embodiment, a release (deallocation) of all the physical memory that is not within the desired physical range of the memory is completed utilizing the application functions provided by the OS.

An algorithm (pseudo-code) for completing one embodiment of the features of the invention is provided below and further explained in the process flow of FIG. 4.

The pseudo code for the basic algorithm is as follows:

```
Begin
    Input Parameters:
    NumberOfPagesRequested
    LowerBoundOfRange
    UpperBoundOfRange
    // Set the Maximum amount of memory to allocate
    MaximumMemoryToAllocate = AmountOfPhysicalMemoryInTheSystem / PageSize;
    // Loop until the memory runs out, the number of pages requested has been satisfied, or the maximum memory to allocate has been reached
        while( (MaximumMemoryToAllocate has not been allocated and
            CurrentInRangePages < NumberOfPagesRequested and
            PhysicalAllocate( ) is still returning addresses)
        {
            // Allocate the physical memory putting the allocated pages into the PageArray
            physicalpagesallocated = PhysicalAllocate(NumberOfPagesRequested, PageArray)
            // Loop through all the pages allocated and see if any fit in the range
            for(x=0; x < physicalpagesallocated && CurrentInRangePages < NumberOfPagesRequested; x++)
            {
                // Check to see if the page fits within the upper and lower bounds
                if( PageArray[x] physical address <= UpperBoundOfRange &&
                    PageArray[x] physical address >= LowerBoundOfRange)
                {
                    // Save the page for future use
                    save page in CurrentInRangePages array
                    CurrentInRangePages++;
                }
                else
                {
                    //Page is unneeded, mark it, but don't deallocate it just yet
                    mark page for physical deallocation
                }
            }
        }
        Deallocate all pages marked for deallocation and pages not upper bound/lower bound tested
        Return the CurrentInRangePages array and CurrentInRangePages
End
```

Figure 4:
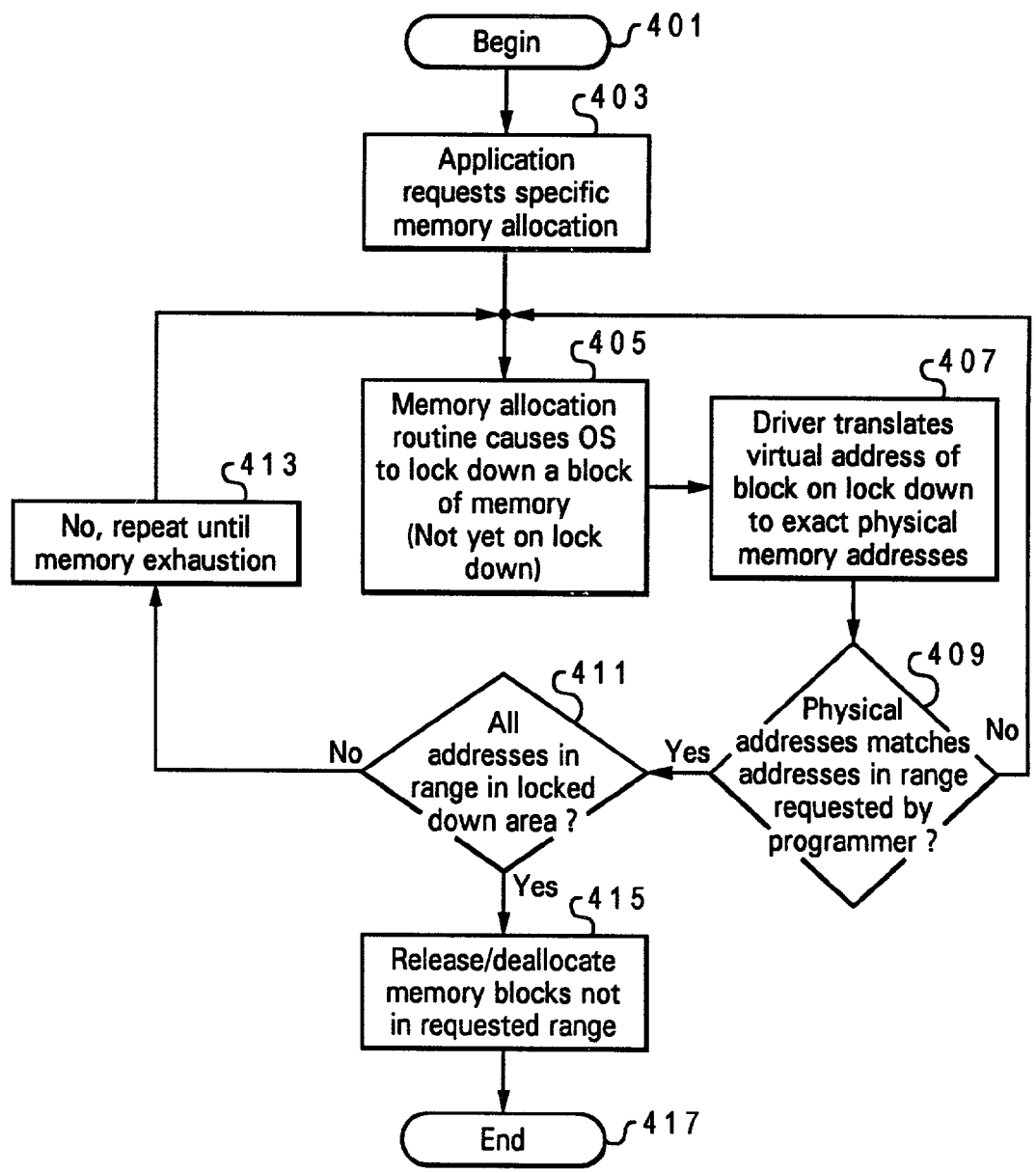
FIG. 4 is a flow chart of the process by which specific memory blocks are allocated to an application utilizing the features of a preferred embodiment of the present invention.

FIG. 4 illustrates the flow of the general process for performing the specific memory allocation according to the preferred embodiment of the invention. The process begins at block 401 and thereafter proceeds to block 403, which indicates application requesting specific memory allocation and the request being passed to the OS. Following, the OS locks down a block of memory equal to the size of memory required by the application as shown at block 405. The memory block is allocated and locked down in a single step utilizing the AWE APIs provided by the OS. The OS then forwards the virtual memory addresses of the memory that has been locked down to the kernel mode driver, which translates the virtual memory addresses into their associated physical addresses and returns the physical addresses to the OS as shown at block 407. In the preferred embodiment, the OS, directed by the MAS, utilizes the standard AWE API calls to accomplish this task. Then, as shown at block 409, MAS completes a check to determine if the physical memory that is locked down fits within the desired range pre-selected by the application developer. The pre-selected range is a parameter that is stored within MAS or the application and provided to the checking process when required. If the check indicates that there is a memory address within the locked down memory blocks that fits within/on the desired range, then another determination is made at block 411, whether all of the requested specific memory has been locked down. If all the memory has been locked down, then MAS begins a process of deallocating memory blocks not within the range as shown at block 413. Otherwise, the lock-step process (i.e., memory lock down, address translation, MAS checking for addresses within range) is repeated until physical memory runs out (or the maximum memory to allocate is reached) as indicated at block 415.

During deallocation of memory, all or some of the memory not in the range that was locked down is deallocated and only the memory addresses that are in the range are returned (i.e., allocated) to the application process. In the preferred embodiment, while memory lock down is being repeated, the memory that was allocated (locked down) including memory determined to not be within the desired range is not released. Thus, only if physical memory runs out before the MAS process ends is the memory not within the range deallocated. When this occurs, the memory allocated within the range is passed back and additional memory may be allocated by the OS to supplement the memory still required by the application.

According to the preferred embodiment, deallocation of unwanted pages only occurs when all of the desired memory is already locked. This is because, if the memory was deallocated immediately after it was deemed to not fit in the range, then there is a likelihood that subsequent lock down processes may obtain the same memory page when another allocation is completed. After lock down process has been completed, the process ends as indicated at block 417.

There are several possible variations to the basic process described above. In a first embodiment, the OS determines if the desired amount of memory and range can be accommodated without having to necessarily keep grabbing more memory until the system is out of memory. Accordingly, possible values for the maximum amount of memory to allocate can be represented by one of several formulas. The maximum memory allocation may be calculated as being equal to: (1) amount of physical memory in the system (implemented in the basic algorithm); (2) (amount of physical memory in the system−size of the range asked for)+the amount of physical memory asked for; (3) amount of available physical memory in the system; or (4) (amount of available physical memory in the system−size of the range asked for)+the amount of memory asked for.

In another embodiment, instead of allocating physical memory in chunks that the programmer requested, memory is allocated all in one chunk based on the maximum amount of physical memory needed to get the desired range. In yet another embodiment, the physical memory that the user requested is allocated in chunks, but the chunk size is reduced as more memory is grabbed that is within the desired range.

Figure 5:
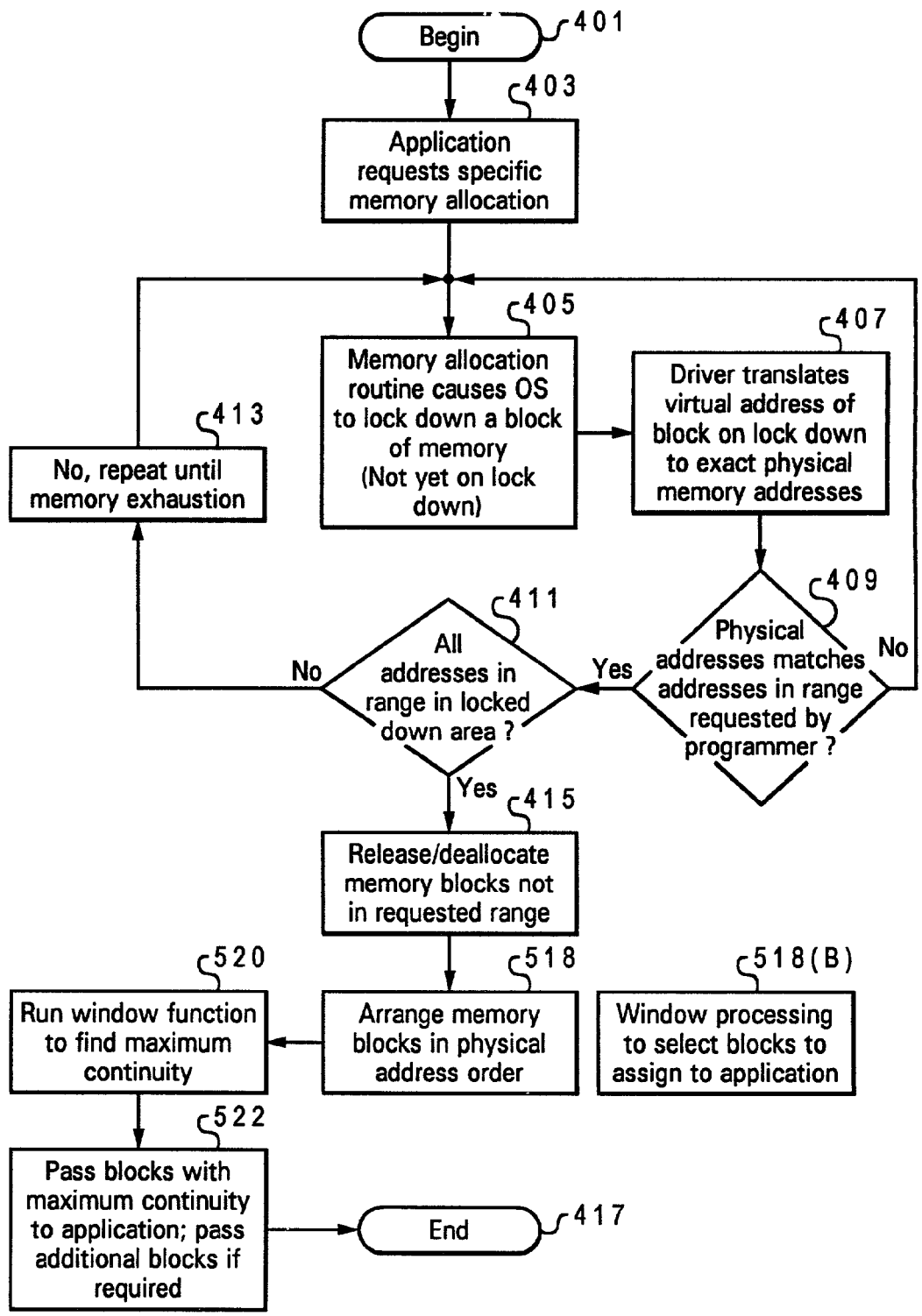
FIG. 5 is a flow chart of the process of FIG. 4, including several additional processing steps in accordance with an alternate embodiment of the present invention.

FIG. 5 is a flow chart of the process by which the invention is implemented, including many of the steps of FIG. 4, but also illustrating a few other functional steps utilized in the organization and processing of the physical pages allocated. Thus, to the extent that functional blocks of FIG. 5 overlap in content with FIG. 4, these blocks are not described in the description of FIG. 5. Beginning at block 415, the deallocation in completed via an ascending/descending sort as indicated at block 518. All of the pages that fit within the range are sorted in ascending order, providing a continuous organization of the memory blocks. Following, a maximum continuity is found as indicated at block 520. The MAS processing goes through all of the pages that were sorted and finds the section with the greatest sequential continuity. For example, there may be 200 MB of pages that fit into the range, but the application developer may have only requested 100 MB allocated to the application processes. Thus, the MAS checks the 200 MB of memory looking for a continuous or almost continuous section with 100 MB. This check may comprise moving a 100 MB "window" through the 200 MB of memory to determine, which position of the window yields the highest continuity. Following, as shown at block 522, the memory blocks with the maximum continuity are passed to the application along with additional memory blocks if required.

Alternatively, the method of sorting though the allocated memory blocks is completed with a Window-like processing. When Windows® OS allocates AWE physical pages, there is a certain pattern to the arrangement of the physical pages. Since the basic algorithm does not provide this pattern, an additional routine is coded within MAS.dll to organize the physical pages in a manner, which keeps in the spirit of the Windows®-like pattern. This organization/arrangement helps to make physical address arrangement appear to have been allocated (and thus arranged) by Windows® OS, while still maintaining the desired range.

Further, the sorting and Windows®-like routines may also be adjusted in various ways for time concerns. That is, the Windows®-like routine could limit its search for a good Windows®-like match, and the sorting routine could be set to "mostly" sort the pages instead of completely sorting the pages.

In yet another embodiment, an X separation is provided between the pages to create a unique effect. For example, a 32 MB separation between pages could be helpful if a system has a 32 MB cache and the processing is designed to focus on cache misses.

Figure 3C:
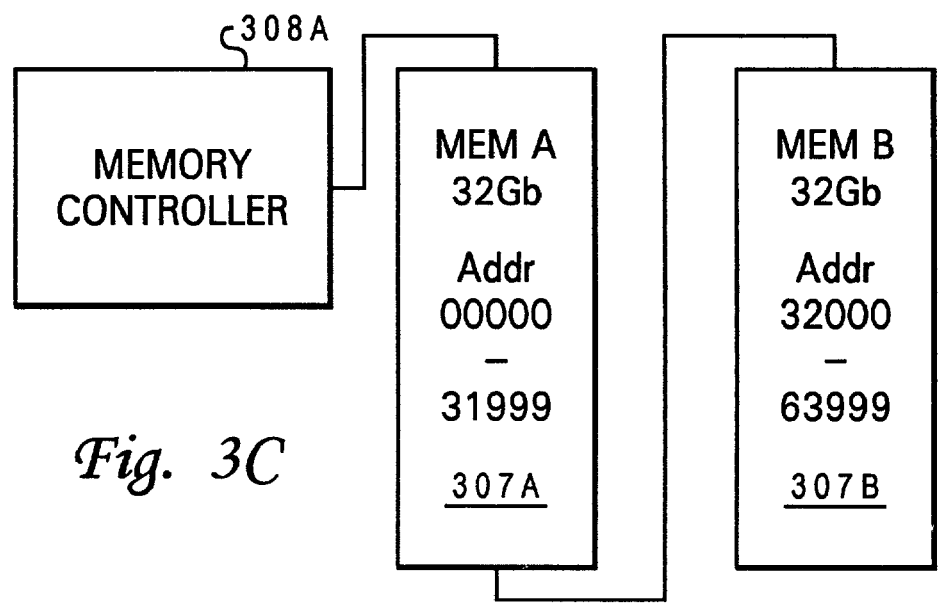
FIG. 3C is another representation of memory components of FIG. 3B as seen from the memory controller, driver, and OS in accordance with one implementation of the present invention in a multi-node configured computer system.
Figure 3A:
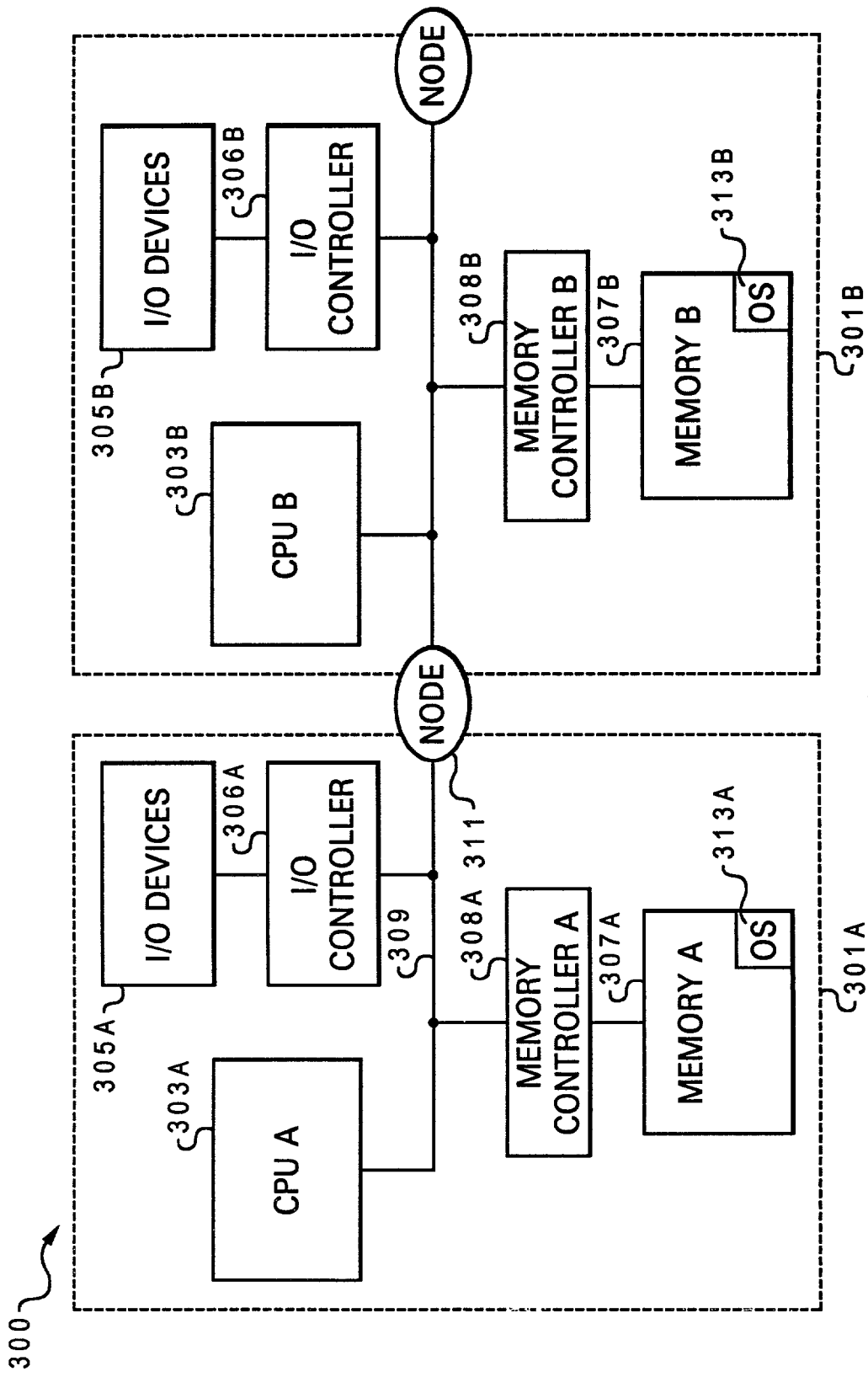
FIG. 3A is a block diagram illustrating the core components and peripheral devices of a multi-node data processing system with multiple memory components within which one embodiment of the invention may be implemented.
Figure 3B:
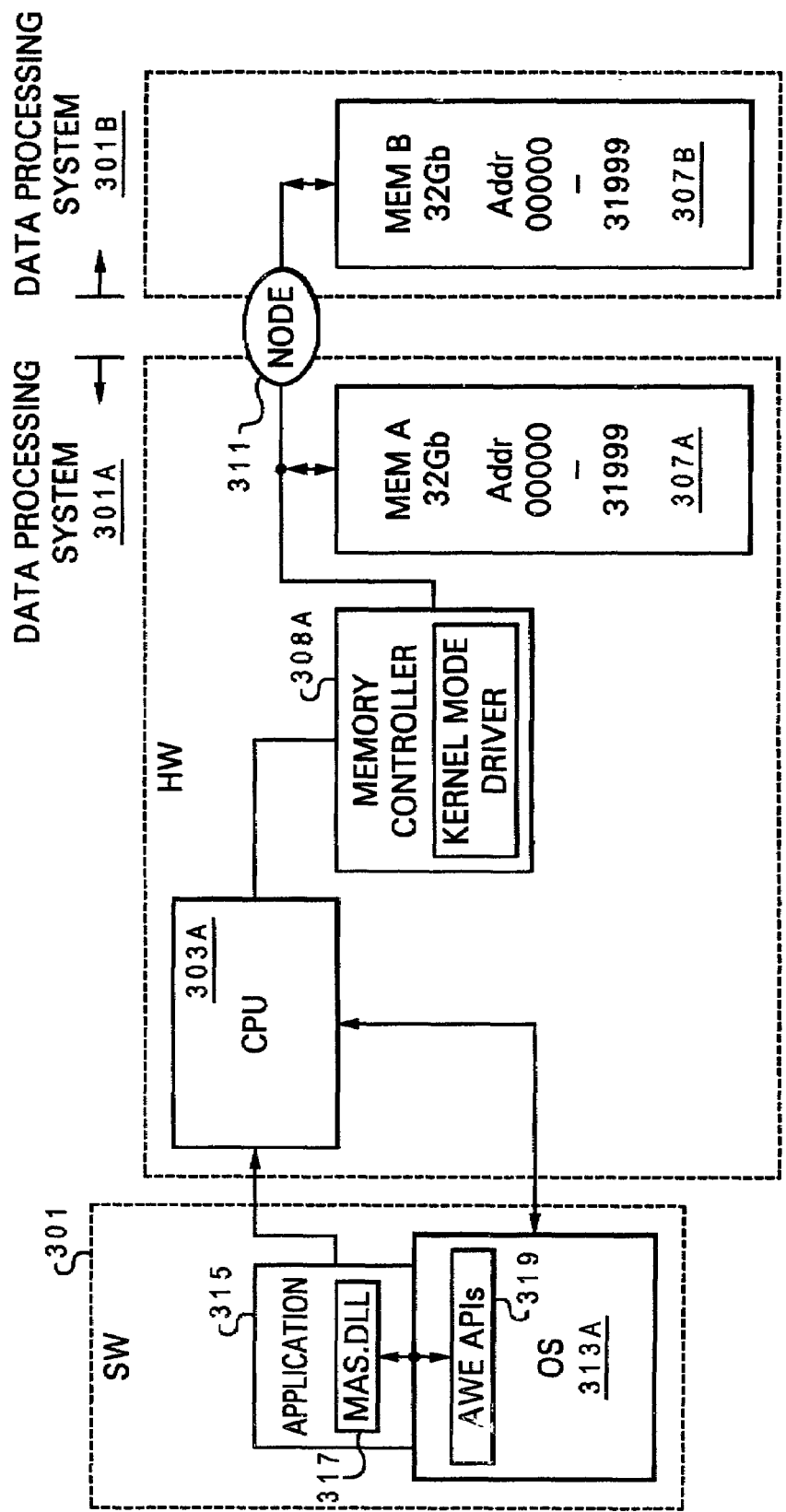
FIG. 3B is a block diagram of the memory components of FIG. 3A and associated physical addresses in accordance with one embodiment of the invention.

FIGS. 3A, 3B, and 3C provide descriptions of the implementation of the features of the invention in a multi-node data processing system. With a multi-node application, MAS has to provide consideration for memory allocation across nodes. The various implementation steps are similar to those in the single node system as described above. However, as those skilled in the art would be aware, the multi-node configuration offers specific implementation considerations that are different from the single node configuration. Turning now to FIG. 3A, there is illustrated a multi-node configured data processing system. Data processing system 300 comprises first processing system 301A and second processing system 301B, which are each independent processing systems, similar to the data processing system of FIG. 1. Thus, both first and second processing systems 301A and 301B comprises major components, including CPU 303A and I/O devices 305A. More importantly to the invention, however, each processing system comprises a separate memory 307A and 307B and thus separate memory controllers 308A and 308B.

Although second processing system 301B is illustrated having similar components as first processing system 301A (i.e., similarly configured), it is possible for second processing system 301B to be configured very differently than first processing system 301A. Both system may operate totally independent of each other and may occasionally operate in concert with each other when resources need to be shared. Connection between both systems is implemented via a node 311, which may be a simple direct system bus connection, a switch, a network connection, or the like.

In the preferred embodiment, memory resources may be shared among first and second system 301A, 301B. Thus, memory controller 308A may allocate/deallocate memory blocks in memory 307B, for a process running on CPU 303A. Likewise, memory controller 308B may allocate/deallocate memory blocks in memory 307A, for a process running on CPU 303B.

Although, the illustrated embodiment depicts only basic components of a multi-node data processing system interconnected via a node, it is understood that data processing system 300 may be more complex. Data processing system 300 may comprise additional processing systems connected via additional nodes, with each processing system having additional components (or similar components with a different configuration).

Referring now to FIG. 3B, there are illustrated software and hardware components of a multi-node data processing system illustrating the separate memory blocks and corresponding addresses. The alternate embodiment of the invention allows the specific allocation of the entire array of available memory, including memory situated across nodes (e.g., memory 307A and memory 307B of FIG. 3A). FIG. 3B illustrates the two memory blocks, memory 307A, 307B of FIG. 3A and associated memory addresses. As seen by memory controller 308A, memory 307B is comprised of tagged addresses, representing a continuation of the memory addresses available in memory 307A. As seen from their respective processors and memory controllers, both memory 307A and memory 307B includes address range 00000–31999. However, for simplicity, it is assumed herein that memory controller 308A sees memory 307B as having address range 32000–63999. Of course, the exact nature of sharing memory across nodes may vary such that specifying an address range may not require the controller viewing the separate memory as a contiguous memory block.

The invention is mainly concerned with allocating physical memory for software. However, the MAS.dll may be included within other tools implemented in software applications and may be extended to various other subsystems besides memory in the Windows® 2000 environment. One major advantage of using this invention is that a user can lock down specific physical memory locations in a particular range of physical addresses for software. Additionally, the invention finds particular applicability to testing procedures for memory and memory operation, since the tester (designer of the test application) is able to isolate specific areas/blocks/addresses of memory for testing.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution. Examples of signal bearing media include recordable media such as floppy disks, hard disk drives, CD-ROMs, and transmission media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A system for directing memory allocation in a data processing system, said system comprising:

means, responsive to a request for allocation of memory by an application executing on said data processing system, for selecting a block of memory to allocate to said application;

means for translating a virtual address of the selected memory block into its corresponding physical address within memory;

means for querying said physical address to determine if it is a programmatically pre-selected physical address desired by said application, wherein said desired physical address is specified by program code of said application and provided as a parameter value to components carrying out said memory allocation, which program code enables selection of a memory block corresponding to the pre-selected physical address;

means for passing said selected memory block for utilization by said application only when said physical address matches said desired, pre-selected physical address; and wherein, when said data processing system is a multi-node system having a first and a second processing system each with individual memory;

said allocating means allocates a memory block on a memory of said second processing system for an application executing on said first processing system, wherein each processing system includes an allocation mechanism capable of allocating memory blocks from the other processing system;

said translating means translates said virtual address to a physical address on said memory of said second processing system; and when said physical address of the memory block of the second processing system matches the programmed physical address of the application, passing said memory block of the second processing system to the application.

2. The system of claim 1, further comprising:

means, responsive to said memory block allocated not having said desired physical address, for allocating another block of memory to said application; and repeating said translating and querying steps for said another block of memory, wherein said allocating and repeating steps are completed until the memory blocks allocated include said desired physical address, wherein said program code overrides a normal selection of a first available memory block by the operating system.

3. The system of claim 2, said means for allocating of memory further comprising means for concurrently locking down memory blocks previously allocated to prevent repetitive selection of previously allocated memory blocks during said allocating.

4. The system of claim 2, further comprising means, when said memory block allocated includes other physical addresses in addition to said desired physical address, for de-allocating portions of said memory block corresponding to the other physical addresses allocated that do not contain said desired physical address.

5. The system of claim 1, wherein said desired physical address comprises a range of memory addresses that is at least as large as a size of memory required by said application within said range of memory addresses, said system further comprising means for prompting a user to enter parameter values for said range of memory addresses and said size of memory.

6. The system of claim 2, wherein:
said allocating means initially allocates all of the available memory to said application; and said comparing means includes immediately de-allocating portions of said allocated memory not within the range of desired physical address.

7. The system of claim 2, further comprising means for selecting an algorithm for completing said allocation and repeating steps, wherein said algorithm is selected from among several available algorithms based on an indication by a user, wherein further, absent said indication, a default algorithm is automatically selected.

8. The system of claim 7, wherein said selecting means differentiates among several calculation processes for determining a maximum amount of memory to allocate during each allocating step, said calculation processes including: (1) calculating the maximum amount of memory to allocate as an amount of physical memory in the system; (2) calculating the maximum amount of memory to allocate as the result of (amount of physical memory in the system−size of the range requested)+the amount of physical memory required; (3) calculating the maximum amount of memory to allocate as an amount of available physical memory in the system; and (4) calculating the maximum amount of memory to allocate as the result of (amount of available physical memory in the system−size of the range requested) +the amount of memory required by said application, wherein said range is a range of addresses comprising said desired physical address and one of said calculation processes is utilized.

9. The system of claim 7, wherein said allocating means includes means for allocating said memory block in a chunk size, which chunk size is gradually reduced as more memory with said desired physical address is allocated.

10. The system of claim 2, further comprising:
means for organizing allocated blocks of memory into address order;
means for determining a section of said allocated blocks with said desired physical address that has maximum continuity; and
means for passing said section to said application, wherein when said section is not as large as a memory space required, additional sections with said desired physical address are allocated and passed, wherein a memory space required is an actual size of physical memory required by the application and a size of said desired physical address is at least as large as said memory space required.

11. The system of claim 10, wherein said determining means comprises means for moving a size X window over said allocated blocks, wherein X is the amount of memory space required by said application.

12. The system of claim 2, further comprising:
means for organizing said allocated memory in a pattern similar to a pattern provided by a Window's operating system; and
said querying means includes means for conducting a search for a match to said pattern provided by said Window's operating system.

13. The system of claim 2, wherein said data processing system comprises:
a memory allocation routine executing along with an operating system (OS) of the data processing system and which manages the allocation of memory processes of an application to a specific, pre-programmed physical memory location; and
a cache wit a cache size of Z units, wherein said system includes means for providing a separation of Z units between allocated memory pages to enable tracking of cache misses.

14. A method for allocating memory on a data processing system comprising:
receiving a pre-programmed specific physical memory location to allocate to processes of an application;
executing said application on said data processing system, wherein said application requires access to memory of said data processing system;
responsive to an operation requesting access to memory by said application, automatically assigning said pre-programmed specific physical memory location to said operation, wherein only said pre-programmed specific physical memory location is assigned to that application,
calculating a physical memory location corresponding to a virtual address provided by said operation; and
interactive allocating memory blocks and comparing a physical address of said allocated memory blocks with said specific physical memory location, wherein, when said allocated memory block is within said physical memory location said allocated memory block is passed to said application
responsive to some of said allocated memory block comprising all required memory within said specific physical memory location as well as other physical memory not within said specific physical memory location, de-allocating the other physical memory within memory block;
prompting a user for input of said specific physical memory location; and
prompting a user for selection of a particular algorithm to utilize within said calculating and allocating steps, wherein said algorithm is selected from among: (1) calculating the maximum amount of memory to allocate as an amount of physical memory in the system; (2) calculating the maximum amount of memory to allocate as the result of (amount of physical memory in the system−size of the range requested)+the amount of physical memory required; (3) calculating the maximum amount of memory to allocate as an amount of available physical memory in the system; and (4) calculating the maximum amount of memory to allocate as the result of (amount of available physical memory in the system−size of the range requested)+the amount of memory required by said application, wherein said range is a range of addresses comprising said desired physical address and one of said calculation processes is utilized.

15. A computer program product for directing memory allocation in a data processing system, said program product comprising:
a tangible computer readable medium; and
program instructions on said tangible computer readable medium for:
responsive to a request for allocation of memory by an application executing on said data processing system, selecting a block of memory to said application;
translating a virtual address of said selected memory block into its corresponding physical address within memory;
querying said physical address to determine if it is a programmatically pre-selected physical address desired by said application, wherein said desired physical address is specified by program code of said application and provided as a parameter value to components carrying out said memory allocation, which program code enables selection of a memory block corresponding to the pre-selected physical address;
passing said selected memory block for utilization by said application only when said physical address matches said desired, pre-selected physical address and
wherein, when said data processing system is a multi-node system having a first and a second processing system each with individual memory:
said allocating program instructions allocates a memory block on a memory of said second processing system for an application executing on said first processing system, wherein each processing system includes an allocation mechanism capable of allocating memory blocks from the other processing system;
said translating program instructions translates said virtual address to a physical address on said memory of said second processing system; and
when said physical address of the memory block of the second processing system matches the programmed physical address of the application, passing said memory block of the second processing system to the application.

16. The computer program product of claim 15, further comprising program instructions for:
responsive to said memory block allocated not having said desired physical address, allocating another block of memory to said application; and
repeating said translating and querying steps for said another block of memory, wherein said allocating and repeating steps are completed until the memory blocks allocated include said desired physical address, wherein said program instructions overrides a normal selection of a first available memory block by the operating system.

17. The computer program product of claim 16, said program instructions for allocating of memory further comprising program instructions for concurrently locking down memory blocks previously allocated to prevent repetitive selection of previously allocated memory blocks during said allocating.

18. The computer program product of claim 16, further comprising program instructions for:
when said memory block allocated includes other physical addresses in addition to said desired physical address, for de-allocating portions of said memory block corresponding to the other physical addresses allocated that do not contain said desired physical address.

19. The computer program product of claim 15, wherein said desired physical address comprises a range of memory addresses that is at least as large as a size of memory required by said application within said range of memory addresses, said program product further comprising program instructions for prompting a user to enter parameter values for said range of memory addresses and said size of memory prior to execution of said application.

20. The computer program product of claim 16, wherein:
said program instructions for allocating initially allocates all of the available memory to said application; and
wherein said program instructions for comparing includes instructions for immediately de-allocating portions of said allocated memory not within said range.

21. The computer program product of claim 16, further comprising program instructions for selecting an algorithm for completing said allocating and repeating steps, wherein said algorithm is selected from among several available algorithms based on an indication by a user, wherein further, absent said indication, a default algorithm is automatically selected.

22. The computer program product of claim 21, wherein said program instructions for selecting an algorithm includes instructions for differentiating among several calculation processes for determining a maximum amount of memory to allocate during each allocating step, said calculation processes including: (1) calculating the maximum amount of memory to allocate as an amount of physical memory in the system; (2) calculating the maximum amount of memory to allocate as the result of (amount of physical memory in the system−size of the range requested)+the amount of physical memory required; (3) calculating the maximum amount of memory to allocate as an amount of available physical memory in the system; and (4) calculating the maximum amount of memory to allocate as the result of (amount of available physical memory in the system−size of the range requested)+the amount of memory required by said application, wherein said range is a range of addresses comprising said desired physical address and one of said calculation processes is utilized.

23. The computer program product of claim 21, wherein said program instructions for allocating said memory includes instructions for allocating said memory block in a chunk size, which is gradually reduced as more memory with said desired physical address is allocated.

24. The computer program product of claim 16, wherein said algorithm comprises a window function, wherein said program instructions further comprises instructions for checking said allocated memory in blocks and sliding said window across said blocks to determine whether said blocks fit within said window, wherein said window includes a start address and an end address within said desired physical address.

25. The computer program product of claim 16, further comprising program instructions for:
organizing allocated blocks of memory into address order;
determining a section of said allocated blocks within said desired physical address that has maximum continuity; and passing said section to said application, wherein when said section is not as large as a memory space required, additional sections with said desired physical address are allocated and passed, wherein a memory space required is an actual size of physical memory required by the application and a size of said desired physical address is at least as large as said memory space required.

26. The computer program product of claim 25, wherein said program instructions for determining a section comprises instructions for moving a size X window over said allocated blocks, wherein X is the amount of memory space required by said application.

27. The computer program product of claim 16, further comprising program instructions for:
   organizing said allocated memory in a pattern similar to a pattern provided by a Window's operating system; and
   conducting a search for a match to said pattern provided by said Window's operating system.

28. The computer program product of claim 16, wherein said data processing system comprises a cache with a cache size of Z units, wherein said method includes providing a separation of Z units between allocated memory pages to enable tracking of cache misses.

29. A data processing system comprising:
   a processor that executes application processes;
   a memory interconnect to said processor;
   an operating system; and
   program means executing on the processor for allocating only pre-selected, specific physical memory locations to said application processes corresponding to a pre-programmed physical location specified for the application processes, said program means comprising:
   means for receiving a specific physical memory location to allocate to processes of an application;
   means for executing said application on said data processing system, wherein said application requires access to memory of said data processing system; and
   means, responsive to an operation requesting access to memory by said application, for automatically assigning said specific physical memory location to said operation.
   means for testing allocation of specific physical memory locations and response to said allocation.

30. The data processing system of claim 29, further comprising:
   Program means for calculating a physical memory location corresponding to a virtual address provided by said operation; and
   program means for interactively allocating memory blocks and comparing a physical address of said allocated memory blocks with said specific physical memory location, wherein, when said allocated memory block is within said physical memory location said allocated memory block is passed to said application.

31. The data processing system of claim 30, further comprising:
   a memory allocation routine executing along with an operating system (OS) of the data processing system and which manages the allocation of memory processes of an application to a specific, preprogrammed physical memory location; and
   wherein said memory allocation routine includes program means, responsive to some of said allocated memory block comprising all said required memory within said specific memory location, for de-allocating all allocated memory block not within said specific physical memory location.

32. The data processing system of claim 31, further comprising:
   program means for prompting a user for input of said specific physical memory location; and
   program means for prompting a user for selection of a particular algorithm to utilize within said calculating and allocating steps, wherein said algorithm is selected from among: (1) calculating the maximum amount of memory to allocate as an amount of physical memory in the system; (2) calculating the maximum amount of memory to allocate as the result of (amount of physical memory in the system−size of the range requested)+the amount of physical memory required; (3) calculating the maximum amount of memory to allocate as an amount of available physical memory in the system; and (4) calculating the maximum amount of memory to allocate as the result of (amount of available physical memory in the system−size of the range requested)+the amount of memory required by said application, wherein said range is a range of addresses comprising said desired physical address and one of said calculation processes is utilized.

* * * * *

UNITED STATES PATENT AND TRADEMARK OFFICE
CERTIFICATE OF CORRECTION

| | | |
|---|---|---|
| PATENT NO. | : 7,000,087 B2 | Page 1 of 1 |
| APPLICATION NO. | : 10/008615 | |
| DATED | : February 14, 2006 | |
| INVENTOR(S) | : Atherton et al. | |

It is certified that error appears in the above-identified patent and that said Letters Patent is hereby corrected as shown below:

In Claim 13, at column 14, line 19, delete "wit" and insert --with--.

Signed and Sealed this

Nineteenth Day of September, 2006

JON W. DUDAS
*Director of the United States Patent and Trademark Office*